UNITED STATES PATENT OFFICE.

ALEXANDER K. MURRAY, OF BRADFORD, PENNSYLVANIA.

ARTIFICIAL FUEL.

SPECIFICATION forming part of Letters Patent No. 419,869, dated January 21, 1890.

Application filed June 14, 1889. Serial No. 314,279. (No specimens.)

*To all whom it may concern:*

Be it known that I, ALEXANDER K. MURRAY, a citizen of the United States, residing at Bradford, in the county of McKean and State of Pennsylvania, have invented certain new and useful Improvements in Artificial Fuel; and I do declare the following to be a full, clear, and exact description of the invention, such as will enable others skilled in the art to which it appertains to make and use the same.

My invention relates to artificial fuel, and has for its object to furnish a fuel in which anthracite-coal dust (which, although many efforts have been made to utilize it, still remains practically a waste substance) forms the main body or bulk. As is well known, such dust or any coal-dust, although combustible, cannot practically be utilized in the form of dust, for the reason that it will choke up. On the other hand, if the particles of such dust were singly ignited or presented separately to the action of the fire, as by being carried into the fire by an air-blast, the particles would be instantly consumed. Therefore to utilize this dust these antagonistic objections must be overcome, and this I do in making my fuel.

In making up my fuel I take, for instance anthracite-coal dust, three parts; bituminous-coal dust, one part, and sawdust or any wood fiber, about ten per cent. of the bulk of the combined coal-dust. These I thoroughly mix in a dry state. I now take a quantity of clay, by preference the variety known as "blue clay"—say from five to ten per cent. of the bulk of the combined coal-dust—and mix it with water until it is of about the consistence of stiff mortar. The mixture of the last paragraph is then stirred into and mixed with the mixture of coal-dust and sawdust before described until the whole mass is of a consistence which will permit of being molded or worked into the form of balls, blocks, &c. The whole is then placed into molds and pressed into blocks or balls. The resultant mixture forms a fuel which by numerous tests and practical use I have found will readily ignite, burn with an intense heat, form into ashes, which will gradually flake off, and be thus gradually wholly consumed.

In adding the bituminous coal to the anthracite I supply it with certain properties which it lacks—such as sulphur and bitumen in small quantities—which are useful, inasmuch as they prevent the too rapid disintegration of the mass of the manufactured fuel.

The addition of the clay, which is more refractory than coal, coats the particles of coal-dust and fiber in such a manner that the consumption thereof is retarded to a desirable degree and furnishes the adhesive quality necessary to cause them to retain their ball or block form.

The mass without the fiber would be liable to harden on the outside when ignited and fail to be fully consumed; but the fiber, being highly combustible, is consumed as soon as reached, and causes the outside of the block or ball to gradually and surely flake or slough off in the form of ashes.

Having thus fully described my invention, what I claim herein as new and of my own invention, and desire to secure by Letters Patent of the United States, is as follows:

The artificial fuel herein described, consisting of the dry mixture of anthracite and bituminous coal dusts and sawdust incorporated, as set forth, with the mixture of clay and water, in about the proportions named.

In testimony whereof I affix my signature in presence of two witnesses.

ALEXANDER K. MURRAY.

Witnesses:
WILL E. AUGHINBAUGH,
SHIPLEY BRASHEARS.